US008101095B2

(12) United States Patent
Dabrowski et al.

(10) Patent No.: US 8,101,095 B2
(45) Date of Patent: Jan. 24, 2012

(54) ANTIFERROELECTRIC ORTHOCONIC LIQUID CRYSTALLINE MATERIAL WITH LONG PITCH AND THE METHOD OF ITS PREPARATION

(75) Inventors: Roman Slawomir Dabrowski, Warsaw (PL); Krzysztof Ludwik Czuprynski, Warsaw (PL); Przemyslaw Kula, Warsaw (PL); Magdalena Zurowska, Warsaw (PL); Wojciech Rejmer, Radom (PL); Wiktor Piecek, Zaborow (PL); Zbigniew Raszewski, Warsaw (PL)

(73) Assignee: Wojskowa Akademia Techniczna IM. Jaroslawa Dabrowskiego, Warsaw (PL)

( * ) Notice: Subject to any disclaimer, the term of this patent is extended or adjusted under 35 U.S.C. 154(b) by 0 days.

(21) Appl. No.: 12/759,185

(22) Filed: Apr. 13, 2010

(65) Prior Publication Data

US 2010/0258765 A1    Oct. 14, 2010

(30) Foreign Application Priority Data

Apr. 14, 2009   (PL) .......................... 387790

(51) Int. Cl.
C09K 19/20    (2006.01)
C09K 19/12    (2006.01)
C07C 69/76    (2006.01)
C07C 43/225   (2006.01)

(52) U.S. Cl. ......... 252/299.64; 252/299.65; 252/299.66; 252/299.67; 560/55; 560/59; 560/60; 560/61; 560/62; 560/64; 560/65; 568/642

(58) Field of Classification Search ............. 252/299.01, 252/299.64, 299.65, 299.67; 560/55, 59, 560/60, 61, 62, 64, 65; 568/642
See application file for complete search history.

(56) References Cited

U.S. PATENT DOCUMENTS
6,919,950 B2   7/2005   Dabrowski et al.

FOREIGN PATENT DOCUMENTS
PL          186152 B1    2/1997

OTHER PUBLICATIONS

CAPLUS 2001: 186901.*
W. Drzewinski et al., Orthoconic Antiferroelectrics, "Synthesis and Mesomorphic Properties of Optically Active (S)-(+)-4(1-Methylheptyloxcarbonyl) phyny 4' —(Fluoroalkanoyloxyalkoxy) biphenyl-4-carboxylates and 4'-(Alkanoyloxyalkoxy) biphenyl 1-4 carboxylates." Polish J. Chem. (2002), 76, pp. 273-284, Institute of Chemistry, military University of Technology, 00-908 Warsaw, Poland.
"Optimization of Antiferroelectric Liquid Crystal Devices at the Degeneration Point," Journal of Applied Physics, vol. 93, No. 8, pp. 4930-4932, Apr. 15, 2003.
R. Dabrowski et al., "High Tilted Antiferroelectric Liquid Crystalline Materials," Elsevier, Display 26, pp. 9-19, 2004.
M. Zurowska et al., "Synthesis and Mesomorphic Properties of Chiral Esters Comprising Partially Fluorinated Alkoxyalkoxy Terminal Chains and a 1-methylheptyl Chiral Moiety," Mol. Cryst. Liq. Cryst vol. 495, pp. 145/[497]-157/[509], 2008.
K. D'Have et al., "Antiferroelectric Liquid Crystals with 45° Tilt—A New Class of Promising Electro-Optic Materials," Ferroelectrics, vol. 244, pp. 115-128, 2000. P. Rudquist et al., "Polymer-Stabilized Orthoconic Antiferroelectric Liquid Crystals," Ferroelectrics, 344: pp. 177-188, 2006.
S. Lagerwall et al., "Unique Electro-Optical Properties of Liquid Crystals Designed for Moelcular Optics," Adv. Funct. Mater., 11, No. 2, Apr. 2001.
J. Gasowska et al., "Comparison of Mesomorphic Properties in Chiral and Achiral Homologous Series of High Tilted Ferroelectrics and Antiferroelectrics," Ferroelectrics, 309: pp. 83-93, Feb. 20, 2004.

* cited by examiner

*Primary Examiner* — Shean Wu
(74) *Attorney, Agent, or Firm* — Roylance, Abrams, Berdo & Goodman, L.L.P.

(57) ABSTRACT

The racemic and chiral compounds expressed by common formula 1 and formula 2:

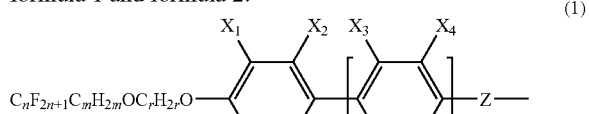

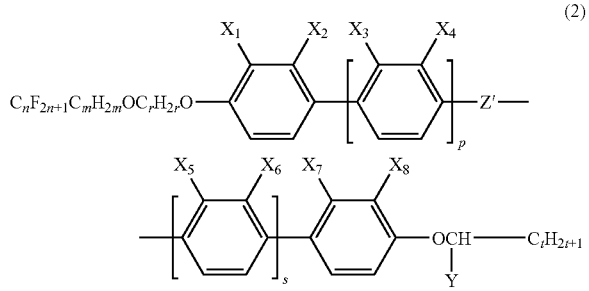

wherein the lateral substituents $X_1, X_2, X_3, X_4, X_5, X_6, X_7$ and $X_8$ in the benzene rings represent independently hydrogen and fluorine atoms, bridge group Z represent independently the single bond or COO, $CH_2CH_2$, $CH_2O$ and $OCH_2$ group, substituent Y represents $CH_3$, or $CH_2F$, $CHF_2$, $CF_3$, $C_2H_5$ group, symbols n, m, r and t are independently integers of 1 to 8; symbols p and s signify independently number of 0 to 1 and its orthoconic antiferroelectric long helical pitch mixtures prepared by the methods 1) to the racemic components selected from compounds 1 are added chiral components selected from the compound of formula 1 and/or chiral components selected from the compounds of formula 2 and/or another optically active compounds with high helical twisting power, 2) to chiral compound 1 which helical pitches increases with the temperature increase is added chiral compound 1 which helical pitch decreases with temperature increase. The mixture shows excellent optical contrast and is applied in displays and photonic devices.

16 Claims, 3 Drawing Sheets

ANTIFERROELECTRIC ORTHOCONIC LIQUID CRYSTALLINE MATERIAL WITH LONG PITCH AND THE METHOD OF ITS PREPARATION

This application claims priority to Polish Patent Application No. P-387790, filed Apr. 14, 2009, which is herein incorporated by reference in its entirety.

BACKGROUND OF THE INVENTION

1. Field of the Invention

This invention relates to smectic liquid crystals, and more precisely the object of the invention are novel compounds with anticlinic smectic phase and their mixtures exhibiting orthoconic antiferroelectric liquid crystalline phase (OAFLC), showing high chemical stability and a large helical pitch value. Such mixtures are applied as liquid crystalline medium in information display devices, optical valves, holography and especially, considering high contrast and wide viewing angle, they have favorable properties for digital projectors and flat graphical screens.

2. Background of the Invention

Smectic antiferroelectric liquid crystals (AFLC) enable the use of a cheaper passive matrix technology with the same image quality which can be obtained by using active matrices.

Figure 1:
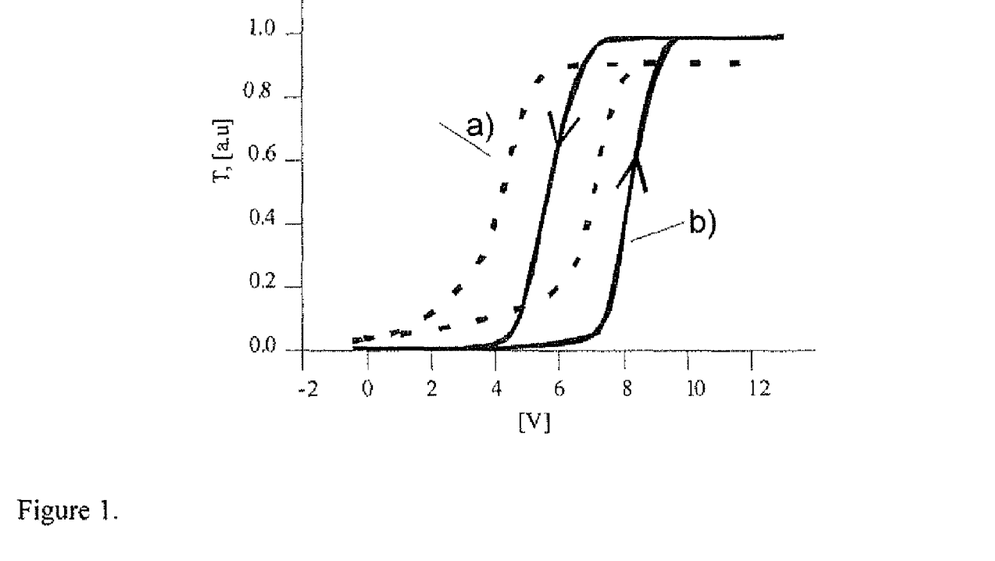
FIG. 1 is a schematic presentation of the voltage dependent light transmission T characteristics for a flat-parallel cell placed in a birefractive system, filled with a) normal (low angle) and b) orthoconic antiferroelectric smectic liquid crystal.

The flaw of most known AFLC materials is quite low dynamic contrast, spoiled by so called pretransitional effect, as shown in FIG. 1. This disadvantage may be removed if the orthoconic liquid crystalline medium is used as described in U.S. Pat. No. 6,919,950 and this liquid crystal medium exhibits a long helical pitch. FIG. 1 schematically presents the voltage dependent light transmission T characteristics for a flat-parallel cell placed in a birefractive system, filled with a) normal (low angle) and b) orthoconic antiferroelectric smectic liquid crystal. The fault is induced in thin cell filled with a liquid crystal with short helical pitch (smaller than cell gap) because the helicoidal structure is not completely unwound. This flaw is removed and high contrast of imaging is available, if the direction of the director (a unit vector along the average direction of the spatial orientation of the main molecular axes of inertia) in the smectic layers in the antiferroelectric phase is tilted at an angle close to optimal 45° to the smectic layer normal. Such antiferroelectric material placed in a thin cell is ordered due to surface action in such a way that in a whole cell a homogeneous direction of layer normal is set, and the helix disappears completely. This is possible when the helical pitch value measured in the free space exceeds the gap of cell filled with antiferroelectric liquid crystal.

In a single smectic layer the director is tilted at the angle of 45° to layer normal and in neighboring layers the directions of the director create angle of 90°. The same angle is observed for the directions of optical axes of the orthoconic antiferroelectric smectic during switching between opposite E(+) and E(−) states. This gives the name of the concerned material: Surface Stabilized Orthoconic Antiferroelectric Liquid Crystal (SSOAFLC).

Homogeneously ordered thin slab of the SSOAFLC without influence of any external fields, is a uniaxial medium, with a negative value of the optical anisotropy and with the optical axis perpendicular to SSOAFLC slab in a cell. For a light beam incident perpendicularly to this slab, SSOAFLC behaves like an optically isotropic medium. Additionally when the $\epsilon_1 \approx (\epsilon_2+\epsilon_3)/2$ is met (where $\epsilon_1, \epsilon_2, \epsilon_3$ are main components of the tensor of the dielectric permittivity) it becomes an optically isotropic medium for all directions of the light incidence [*J. Appl. Phys.*, 93(8), 4930-4932 (2003)].

The optical properties of a thin layer of the SSOAFLC at the chiral anticlinic, antiferroelectric state, make defects of the local disorientation of smectic layers (hence the optical axis) not visible. In such conditions, for cells with SSOAFLC in a birefractive system, a perfect dark state is generated [*Adv. Funct. Mater.*, 11, 87-94 (2001)].

After external electric field is applied to a thin slab of SSOALFC in the direction of smectic layers, it switches from the anticlinic (antiferroelectric) structure to the synclinic (ferroelectric) one, which for a light beam at incidence normal to the SSOAFLC slab is a optically positive, optically biaxial medium (with the orientation of the optical axis in the cell plane and perpendicular to the direction of applied electric field). Considering perfect dark state generated by orthoconic antiferroelectric structure, a large optical contrast on transition from dark state to bright state is observed. Advantages and possibilities of applying of this structure for display fabrication have been described at first time in U.S. Pat. No. 6,919,950.

First known compounds enabling the formulation of multicomponent orthoconic mixtures were esters with perfluoroalkanoyloxy group in the terminal chain. They were described in our patent PL 186152 and later papers [*Polish J. Chem.*, 76, 273-284 (2002); *Ferroelectrics*, 309, 83-93 (2004)].

Using these compounds antiferroelectric mixture W-107 [*Ferroelectrics*, 244, 115-128 (2000)] was obtained and lately many other. Among them the W-193B mixture is best known [*Displays*, 25, 9-19 (2004)].

Figure 2:
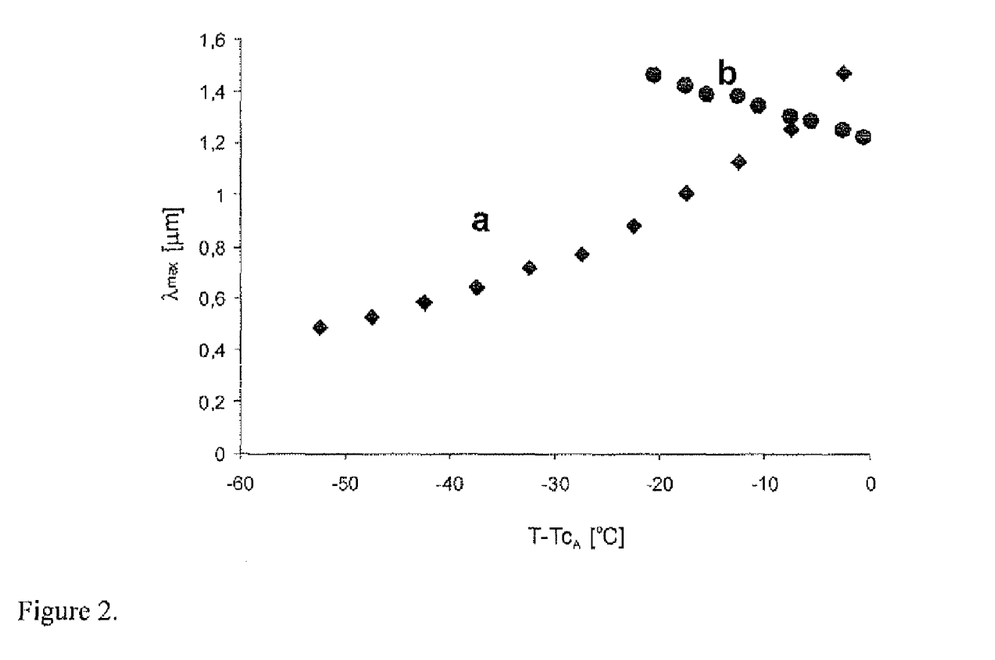
FIG. 2 is a schematic presentation of a comparison of temperature dependencies of the wave length of the selectively reflected light between the different antiferroelectric liquid crystal mixtures a) W-193B and b) a mixture obtained according to the invention.

At the room temperature all of those mixtures exhibit short helical pitch p (where the helical pitch p is smaller than 1 μm) which rises upon the increase of the temperature (see FIG. 2, curve a).

In FIG. 2 temperature dependencies of the wave length of the selectively reflected light have been compared for the different antiferroelectric liquid crystal mixtures a) W-193B and b) a mixture obtained according to the invention. Vertical axis is for values of the wavelength $\lambda_{max}$ at which maximum of the selective light reflection appears. The horizontal line is for the reduced temperature $T-Tc_A$, (where $Tc_A$ is maximum temperature of antiferroelectric phase existence).

Spectrophotometric method is most easily used to measure the value of the helical pitch length p at the range of 0.2-2.0 μm utilizing the phenomenon of the selective light reflection on periodic helicoidal smectic liquid crystal structure. For circularly polarized light beam of wave length $\lambda_{max}$, at the normal incidence to the (O)AFLC slab, the condition $p=\lambda_{max}/n$ (where n is average refractive index of smectic antiferroelectric liquid crystal) is satisfied hence the transmitted light experiences the drop of the intensity by about 50%. It occurs while one portion of circularly polarized light experiences the total internal reflection on periodic helicoidal structure of smectic liquid crystal. When the absorption maximum is observed for the wavelength of $\lambda_{max}$, the value of the helical pitch p can be calculated using formula $p=\lambda_{max}/n$. The helical pitch longer than 2 μm can be measured by i.e. using wedge cell method or can be evaluated by observation of so called dechiralisation lines in the flat parallel cell.

Components and mixtures mentioned above are characterized by the small values of the helical pitch p, growing with the temperature increase. Helical pitch p is very small at the near room temperature range and rises at the high temperatures (which are rather rarely used). Application of such materials demands very thin cells of thickness below 1 μm. Manufacturing of such a thin cell is technologically complicated; furthermore in such a cell the ferroelectric (synclinic) ordering, instead of the antiferroelectric (anticlinic) one is often observed [*Ferroelectrics,* 344, 177-188 (2006)]. Moreover, in submicrometer cells, the surface action operates deeply inside the volume of SS(O)AFLC, what has a negative influence on the relaxation process to the antiferroelectric state after disappearance of the driving electric field.

Achiral orthoconic anticlinic compounds have not yet been discovered. Hopefully, they could be used for obtaining of an OAFLC mixture with any helical pitch value. This seems to be possible by doping of an achiral AFLC with the chiral compound of a high twisting power. The same method is successfully used for the preparation of ferroelectric mixtures.

Also orthoconic smectic antiferroelectrics as individual compounds as well as their mixtures with long pitch are no yet known. They could be obtained, either from chiral compounds with large helical pitch, or from achiral anticlinic smectics C or racemates created from pairs of opposite enantiomers of known antiferroelectrics by introducing some amounts of one enantiomer to obtain enantiomer excess.

Unfortunately, decreasing of optical purity of an antiferroelectric compound or its complete racemization causes very strong destabilization or even complete disappearance of anticlinic (antiferroelectric) phase respectively [*Ferroelectrics,* 309, 83-93 (2004)]. For example, optically active ester of formula A (existing in the form of enantiomer R or S)

Formula A

(S)

is an orthoconic antiferroelectric compound and its phase transitions are:
Cr 47.6 SmC$_A$*91.1 SmC*110.6 SmA 118.5 Iso
but its racemic mixture (equimolar mixture of R and S enantiomers) has following phase transitions:
Cr 55.8 SmC 118.4 SmA 121.1 Iso Therefore until now it was not possible to expand the helical pitch of the antiferroelectric mixture by decreasing optical purity. The similar change of the phase sequence has been observed for compounds with different length of oligomethylene spacers in this family of benzoates as well as for similar biphenylates and many other compounds.

BRIEF SUMMARY OF THE INVENTION

According to aspects of the present invention, racemic and chiral compounds are provided, which are expressed by common formula 1 and formula 2:

wherein the lateral substituents $X_1, X_2, X_3, X_4, X_5, X_6, X_7$ and $X_8$ in the benzene rings represent independently hydrogen and fluorine atoms, bridge group Z represent independently the single bond or COO, $CH_2CH_2$, $CH_2O$ and $OCH_2$ group, substituent Y represents $CH_3$, or $CH_2F$, $CHF_2$, $CF_3$, $C_2H_5$ group, symbols n, m, r and t are independently integers of 1 to 8; symbols p and s signify independently number of 0 to 1 and its orthoconic antiferroelectric long helical pitch mixtures prepared by the methods 1) to the racemic components selected from compounds 1 are added chiral components selected from the compound of formula 1 and/or chiral components selected from the compounds of formula 2 and/or another optically active compounds with high helical twisting power, 2) to chiral compound 1 which helical pitches increases with the temperature increase is added chiral compound 1 which helical pitch decreases with temperature increase. The mixture shows excellent optical contrast and is applied in displays and photonic devices.

DETAILED DESCRIPTION OF THE INVENTION

Surprisingly, there are compounds which racemic forms exhibit stable anticlinic ordering. They can be used for formulation of long pitch AFLCs. Furthermore it has been stated, that in many cases their chiral form may have long or very long helical pitch at the room temperature and the helical pitch value decreases with the increase of temperature. It is quite opposite behavior to commonly observed temperature dependence of earlier known compounds. In homologous series of the compounds being the object of the invention is observed that the members with a short oligomethylene spacer between the fluorinated part of molecule and its rigid core have short helical pitch at room temperature which value increases with temperature and they are right handed for S enantiomer. But for a longer oligomethylene spacer they have large helical pitch at lower temperature range, which value decreases with the increases of temperature and they are left handed for the same S enantiomer.

Such compounds with opposite sense of the helical pitch and the same senses of spontaneous polarization are also very useful for the preparation of an antiferroelectric mixture with the long pitch.

The object of invention is orthoconic antiferroelectric mixture (OAFLC) of improved chemical stability and the long helical pitch value (much more than 1 μm) characteristic that it consists of at least one racemic compound (being the equimolar mixture of R and S enantiomers) and/or at least one achiral compound selected from the set of compounds with the general formula 1:

(1)

in which the lateral substituents: $X_1$, $X_2$, $X_3$, $X_4$, $X_5$, $X_6$, $X_7$, $X_8$, placed in the benzene rings are independently fluorine and hydrogen atoms; bridge group Z is the single bond or COO or $CH_2CH_2$ or $CH_2O$ or $OCH_2$ group; the substituent Y in the chiral chain is $CH_3$ or $C_2H_5$ or $CH_2F$ or $CHF_2$ or $CHF_3$ group, the symbols n, m, r and t are independently integers of 1 to 8; symbols p and s are independently numbers of 0 to 1 and at least one chiral compound (R or S enantiomer) selected from the chiral compounds of the general formula 1 and/or one or more chiral compound (R or S enantiomer) selected from the compounds of the general formula 2, (2)

in which the lateral substituents $X_1$-$X_8$ represent hydrogen or fluorine atoms independently; Z is independently the single bond or COO or $CH_2CH_2$ or $CH_2O$ or $OCH_2$ group, the substitutent Y in the chain is $CH_3$ or $CH_2F$ or $CHF_2$ or $CF_3$ and symbols n, m, r, t, p and s have the same meaning as in the said formula 1, and/or another known optically active compound with high helical twisting power.

According to the invention such mixture can be formulated using a few methods.

First one comprises the step in which one or more racemic compounds of formula 1 is combined with one or more chiral compounds of formula 1 being pure R or S enantiomer. An eutectic composition calculated in the molar or weight ratio is most favorably in order to achieve the lowest melting points of designed mixtures in comparison with melting points of the components. If such mixture has too short helical pitch because of too a high excess of a chiral component it may be used in smaller amounts to obtain desired pitch value. The mixture composition is calculated using an equation:

$$lnX_k = -\Delta H_m^k \left( \frac{1}{T} - \frac{1}{T_m^k} \right),$$

$$\sum_{k=1}^{n} X_k = 1,$$

where: k stands for the number of components, $X_k$ stands for the molar ratio of component k, $\Delta H_m^k$ and $T_m^k$, are melting enthalpy [J/mol] and melting point temperature [K] respectively, here R=8.314 [J/(K·mol)] is the universal gas constant. Most favorable components are compounds with low melting points and low melting enthalpies. Then the components are weighted according to calculated values and heated until the mixture is clearing. After cooling its phase transitions are determined with one of known methods, for example, differential scanning calorimetry or thermal polarizing microscopy method. The racemic components of formula 1 are better then achiral compounds of formula 1. The just ones are obtained for Y=CH$_3$ and t=1 or Y=C$_2$H$_5$ and t=2, but for such compounds in the first case, the mixture with lower tilt is formed than from racemic compounds and in the second case, the mixture with high viscosity arises. The most optimal racemic components for the mixture preparation are difluorosubstituted or monofluorosubstituted or unsubstituted compounds of formula 1, wherein symbols n=3 or 4, m=1 and r=3, 4, 5 and Y=CH$_3$. The examples are given in Table 1. The bigger number of fluorine atoms in molecular rigid core negatively influences on the stability of anticlinic order and decreases the tilt of molecules in the smectic layers.

TABLE 1

Phase transitions of racemic (R,S) compound 1, wherein n = 3, m = 1, r = 3, Z = COO, p = 0, s = 1, t = 6, Y = CH$_3$, X$_3$-X$_8$ = H, X$_1$ and X$_2$ represent independently hydrogen or fluorine atoms. Temperature of phase transitions (° C.) - upper line and melting enthalpy (kJ/mol) - lower line

| Acronym | X$_1$ | X$_2$ | Cr | | SmC$_A$ | | SmC | | Iso |
|---|---|---|---|---|---|---|---|---|---|
| 3F3HF (R,S) | H | F | * | 60.4 | * | 86.8 | * | 88.8 | * |
| | | | | 20.9 | | | | | |
| 3F3FH (R,S) | F | H | * | 64.3 | * | 93.9 | * | 98.3 | * |
| | | | | 19.9 | | | | | |
| 3F3FF (R,S) | F | F | * | 48.3 | * | 95.6 | * | 98.1 | * |
| | | | | 20.3 | | | | | |
| 3F3HH (R,S) | H | H | * | 70.3 | * | 110.0 | * | 111.5 | * |
| | | | | 19.5 | | | | | |

TABLE 2

Phase transitions of chiral compound 1 (S enantiomer), wherein n = 3, m = 1, r = 2-7, Y = CH$_3$, Z = COO, p = 0, s = 1, t = 6, X$_1$-X$_2$ represent independently hydrogen or fluorine atoms and X$_3$-X$_8$ = H - series nFrX$_1$X$_2$ (S) and n = 3, m = 1, r = 6, Y = CH$_3$, Z - single bond, p = 0, s = 1, t = 6, X$_5$ = X$_6$ = F, X$_1$-X$_4$ and X$_7$-X$_8$ = H nFrT56 series. Temperature of phase transitions (° C.) - upper line and melting enthalpy (kJ/mol) - lower line.

| Acronym | X$_1$ | X$_2$ | Cr | | SmC$_A$* | | SmC* | | SmA | | Iso |
|---|---|---|---|---|---|---|---|---|---|---|---|
| 3F2HF(S) | H | F | * | 52.5 | * | 94.8 | * | 103.5 | — | | * |
| | | | | 19.5 | | | | | | | |
| 3F2FH(S) | F | H | * | 69.5 | * | 100.1 | * | 111.4 | — | | * |
| | | | | 23.6 | | | | | | | |
| 3F2FF(S) | F | F | * | 58.5 | * | 101.5 | * | 113.3 | — | | * |
| | | | | 16.7 | | | | | | | |
| 3F2HH(S) | H | H | * | 69.0 | * | 114.9 | * | 127.8 | — | | * |
| | | | | 17.6 | | | | | | | |
| 3F3HF(S) | H | F | * | 39.1 | * | 87.8 | — | | — | | * |
| | | | | 20.3 | | | | | | | |
| 3F3FH(S) | F | H | * | 51.2 | * | 98.9 | — | | — | | * |
| | | | | 24.7 | | | | | | | |
| 3F3FF(S) | F | F | * | 74.0 | * | 97.0 | — | | — | | * |
| | | | | 21.5 | | | | | | | |
| 3F3HH(S) | H | H | * | 54.5; 78.9 | * | 116.2 | — | | — | | * |
| | | | | 3.5; 21.6 | | | | | | | |
| 3F4HF(S) | H | F | * | 54.9 | * | 87.5 | * | 107.0 | — | | * |
| | | | | 28.4 | | | | | | | |
| 3F4FH (S) | F | H | * | 73.1 | * | 95.5 | * | 113.4 | * | 114.5 | * |
| | | | | 28.0 | | | | | | | |
| 3F4FF(S) | F | F | * | 81.45 | * | (109.3) | * | (110.2) | — | | * |
| | | | | 27.3 | | | | | | | |
| 3F4HH(S) | H | H | * | 60.3 | * | 109.5 | * | 130.0 | — | | * |
| | | | | 29.1 | | | | | | | |
| 3F5HF(S) | H | F | * | 28.1 | * | (97.0) | * | (100.2)* | * | 99.0 | * |
| | | | | 34.9 | | | | | | | |
| 3F5FH (S) | F | H | * | 68.7 | * | 108.9* | * | 106.8 | * | 109.6 | * |
| | | | | 25.4 | | | | | | | |
| 3F5FF(S) | F | F | * | 53.5 | * | 106.7 | * | 107.7 | * | 109.2 | * |
| | | | | 21.6 | | | | | | | |
| 3F5HH(S) | H | H | * | 66.8 | * | 121.0 | * | 123.3 | — | | * |

TABLE 2-continued

Phase transitions of chiral compound 1 (S enantiomer), wherein n = 3,
m = 1, r = 2-7, Y = CH$_3$, Z = COO, p = 0, s = 1,
t = 6, X$_1$-X$_2$ represent independently hydrogen or fluorine atoms
and X$_3$-X$_8$ = H - series nFrX$_1$X$_2$ (S) and
n = 3, m = 1, r = 6, Y = CH$_3$, Z - single bond, p = 0, s = 1,
t = 6, X$_5$ = X$_6$ = F, X$_1$-X$_4$ and
X$_7$-X$_8$ = H nFrT56 series. Temperature of phase
transitions (° C.) - upper line and melting enthalpy (kJ/mol) - lower line.

| Acronym | X$_1$ | X$_2$ | Cr | | SmC$_A$* | | SmC* | | SmA | | Iso |
|---|---|---|---|---|---|---|---|---|---|---|---|
| 3F6HF(S) | H | F | * | 18.0<br>42.2<br>34.2 | * | 73.9 | * | 103.7 | * | (108.5) | * |
| 3F6FH(S) | F | H | * | 57.3<br>24.3 | * | 80.1 | * | 108.5 | * | 112.7 | * |
| 3F6FF(S) | F | F | * | 62.6<br>23.2 | * | 84.8 | * | 110.5 | * | 112.8 | * |
| 3F6HH(S) | H | H | * | 60.5<br>24.0 | * | 94.7 | * | 124.8 | * | 126.3 | * |
| 3F7HF(S) | H | F | * | 25.1<br>13.1 | * | 94.7 | * | 99.2 | * | 100.9 | * |
| 3F7FH(S) | F | H | * | 37.4<br>25.6 | * | 103.1 | * | 104.3 | * | 109.1 | * |
| 3F7FF(S) | F | F | * | 50.2<br>22.0 | * | 104.6 | * | 105.9 | * | 109.1 | * |
| 3F7HH(S) | H | H | * | 57.8<br>32.0 | * | 116.3 | * | 120.4 | * | 123.0 | * |
| 3FT56 | F | F | * | 42.1<br>25.1 | * | 60.2 | * | 83.0 | * | 91.3 | * |

TABLE 3

Phase transitions of chiral compound 1 (S enantiomer), wherein n = 3,
m = 1, r = 2-6, Y = CH$_3$, Z = CH$_2$CH$_2$ group,
p = 1, s = 0, t = 6, X$_1$-X$_6$ = H and X$_7$ and
X$_8$ represent independently hydrogen of fluorine atoms nFrE X$_7$X$_8$ series.
Temperature of phase transitions (° C.) - upper line and melting
enthalpy (kJ/mol) - lower line.

| Acronym | X$_7$ | X$_8$ | Cr | | SmC$_A$* | | SmC* | | SmA | | Iso |
|---|---|---|---|---|---|---|---|---|---|---|---|
| 3F2EHH (S) | H | H | * | 110.9<br>59.5 | * | 95 | — | | — | | * |
| 3F3EHH (S) | H | H | * | 102<br>48.0 | * | 93 | — | | — | | * |
| 3F6EHH (S) | H | H | * | 47.2<br>27.0 | * | 84.7 | * | | — | 99.2 | * |
| 3F4EHF (S) | H | F | * | 67.6<br>27.3 | * | 79.3 | * | 83 | * | 84.1 | * |
| 3F6EHF (S) | H | F | — | 40.8<br>24.7 | * | 72 | * | 86 | * | 88 | * |

The examples of chiral components of the formula 1 are given in Table 2 and 3.

Figure 3:
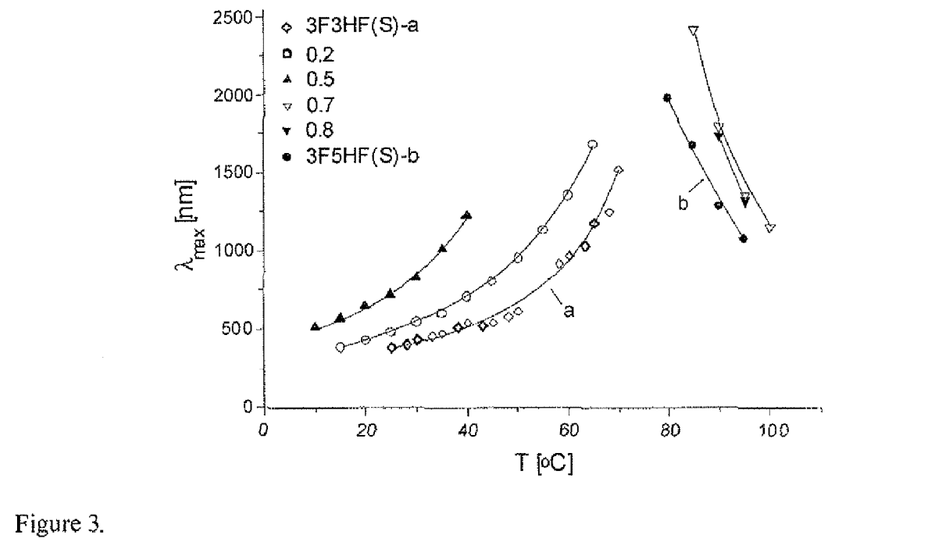
FIG. 3 is a schematic presentation of a comparison of temperature dependence of $\lambda_{max}$ of the selective light reflection between compound 3F3HF(S)—curve a) and for compound 3F5HF—curve b) and their bicomponent mixtures 3F3HF (S)-3F5HF (S) with growing concentration of 3F5HF (S):0.2, 0.5, 0.7, 0.8 mole ratio.

Especially favorable properties exhibit such compounds 1, in which benzene rings are not substituted with fluorine atoms (X$_1$-X$_8$=H) or they are substituted with one or two fluorine atoms (i.e. X$_1$=H and X$_2$=F or X$_1$=F and X$_2$=H or X$_1$=X$_2$=F and the rest substituents X$_3$-X$_8$=H, or X$_7$=F and X$_8$=H or X$_7$=H and X$_8$=F or X$_7$=X$_8$=F and the rest substituents X$_1$-X$_6$=H, the terminal chain consists of 7 or 9 fluorine atoms (n=3 or 4), m=1 or 2, r=2-8 and Z is COO group or the single bond. In case of the chiral compounds 1, with spacer length r≧5, the change of temperature dependence of the helical pitch and its helical sense is observed. S enantiomer with of big and especially odd value r have larger helical pitch value at lower temperatures and smaller at high temperatures and left handed helice. For S enantiomers with low r the opposite temperature dependence is observed (see FIG. 3a, b) and their helice is right handed.

In FIG. 3 the temperature dependence of $\lambda_{max}$, of the selective light reflection have been compared for compound 3F3HF(S)— curve a) and for compound 3F5HF—curve b) and their bicomponent mixtures 3F3HF (S)-3F5HF (S) with growing concentration of 3F5HF (S): 0.2, 0.5, 0.7, 0.8 mole ratio. Definition of these acronyms for compounds is given in Table 2. By this method and using properties of chiral compound 1 mentioned above it is possible to formulate the mixture with long pitch value (increasing as well as decreasing upon the rise of temperature).

Other variety of this method is formulation firstly of an eutectic mixture consisting of optically inactive (racemic or achiral) compounds 1 only, and then to add optically active compound expressed by the common formula 2 or other optically active compound or compounds, most favorably with high helical twisting power. The compounds of formula 2, are new compounds but structurally similar to compounds of formula 1. The carboxylic group at the chiral center has been replaced with oxygen atom but other parts of molecule are the same as in the formula 1. Compound 2 is especially favorable because of its structural similarity. Therefore complexes in the solid phase as in mesophase are not formed and the stability of antiferroelectric phase is changed only in a small degree. From chiral compounds commonly known in the state of art the terphenyl derivatives such as (S,S) or (R,R) 4,4''-bis-(1-methylalkyloxycarbonyl)terphenyl having two chiral center are recommended. In this variation of method, the amount of the chiral compound can be changed freely in very broad ranges from 2 to 50 by wt. %. Using method described above an antiferroelectric material with large helical pitch p and the same time with a small or medium value of spontaneous polarization P can be obtained.

The second way according to the invention is producing an antiferroelectric mixture with long helical pitch using only the chiral compounds of formula 1 only, selected in such way that, at least one, and most favorably a few ones show long helical pitch at low temperature range its or their p decreases with temperature increase as it is shown in FIG. 3-curve a). Surprisingly such properties are observed in the chiral compounds of formula 1, where oligomethylene spacer index r is equal 5, 6 or 7, for example compounds 3F5HF(S), 3F7HF (S), 3F7FH(S), 3F7FF(S), 3F7HH(S), where (S) stands for S enantiomer.

Figure 4:
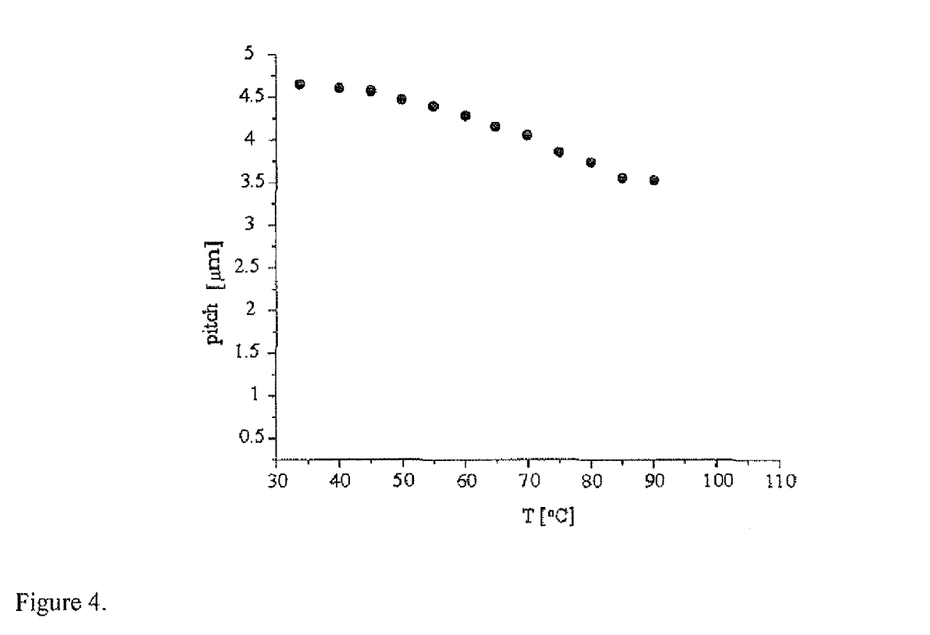
FIG. 4 is a schematic presentation of temperature dependence of a mixture prepared in accordance with an example of the present invention.

The mixture can be prepared, according to this method, only from the chiral compounds of formula 1, selected from the compounds with the helical pitch p decreasing upon the temperature increase (negative temperature dependence). Nearby to the room temperature they exhibit a large helical pitch value p and a large value of the spontaneous polarization P. The compounds with value r=5 and 7 are especially profitable (see FIG. 4 where the temperature dependence of the pitch for mixture 3F5HF (S)-3F7FH(S) is presented).

The compounds with the negative temperature dependence of helical pitch value p can be also mixed with compounds exhibiting the positive temperature dependence of helical pitch value p. Depending on the components ratio α liquid crystal material with different helical pitch p can be obtained. This rule is explained in FIG. 3.

In FIG. 3 the selective reflection of light for the compounds: 3F3HF (S) and 3F5HF(S) and their bicomponent mixture are presented. Compound 3F3HF (S) has the maximum of selective reflection of light at the low wavelength range and the respective pitch of helix is also very short and it is growing with temperature increase. Below temperature of 70° C. the compound 3F5HF (S) has $\lambda_{max}$ out of measurement range of spectrometr (3 μm), therefore pitch is larger than 2 μm. Selective reflection becomes detectable at the temperature of 70° C. Here $\lambda_{max}$ decreases with further temperature increase. Bicomponent mixture 3F3HF (S)-3F5HF (S) with the concentration of the compound 3F3HF (S) up to 50 mole in the mixture has the same temperature dependence of $\lambda_{max}$ as the pure compound 3F3HF (S) but its value is shifted to longer wavelength (p increases). The bicomponent mixture with the concentration of 70% (mole fraction) of 3F5HF (S) or bigger has the same temperature dependence as pure 3F5HF (S) but $\lambda_{max}$ is shifted to longer wavelength (p increases).

According this role it is possible to formulate the mixture with big spontaneous polarization and with desired long pitch by selection of appropriate components. It may have also a weak positive temperature dependence of the helical pitch or the helical pitch length p does not change in a wide temperatures range (the last one is a most desired case) or exhibit a weak negative temperature dependence of the helical pitch p.

The objects of invention are also achiral or racemic liquid crystalline esters of general formula 1 needed for preparation of a base mixture with the anticlinic phase at the broad temperature range.

When the ester bond at the terminal chain COO(CH)Y—$C_rH_{2t+}$ of compound of the template formula 1 is created by the isopropyl alcohol (Y=CH$_3$, t=1) or 3-pentanol (Y=C$_2$H$_5$, t=2), then the ester is achiral. If it is obtained from racemic alcohol (i.e. consisting of equal molar amounts of R and S enantiomers), then the ester is also racemic and optically inactive, owing to opposite compensating twisting power of both R and S enantiomers, Production of racemic alcohols is very cheap, so antiferroelectric mixtures prepared from racemic components are also much less expensive than those consisting of chiral components only. While a pure R or S alcohol is being used for a synthesis of the compound 1 the final product is optically active and maintains the same absolute configuration, when appropriate synthesis method is used.

Synthesis method of chiral compounds of general formula 1 has been described detaily in [Mol. Cryst. Liq. Cryst., 495, 145-155 (2008)]. Achiral compounds can be produced with the same method. The phase transition of the compound 1 with oligomethylene spacing group r=3, 4, 5 and 6 where also given there but their features related to the temperature dependence of the helical pitch (which is very fundamental feature for this invention) are disclosed at first time.

Favorable examples of prepared compounds 1 with the anticlinic phase are given in Table 1 and those with the chiral anticlinic phase (SmC$_A$*) are presented in Tables 2 and 3. The SmC$_A$ phase (in case of racemic one) or SmC$_A$*phase (in case of chiral compounds) are presented at the broad range of temperature. A smectic C phase and/or smectic A phase may also be observed at a narrow range of temperature, just before the clearing temperature. The compounds of formula 2 are new ones. They are prepared in the similar way as compounds 1 if Z=COO. The recommended routs of syntheses for compounds where a single bond stand for Z is shown in Scheme 1.

Scheme 1

This synthesis is multistage process at which two main tasks are accomplished. The first one is the preparation of the terphenyl core by Suzuki-Miyaura coupling reaction. The second one is introduction of terminal group using Mitsunobu reaction. Example of obtained compounds 2 and their phase transitions are given in Table 4. The chiral synclinic smectic C phase (ferroelectric) is the main phase observed here.

TABLE 4

Phase transitions of chiral compounds 2, series nFmrF3F4 (S) (enantiomer S), wherein $X_1 = X_2 = X_7 = X_8 = H$, $X_3 = X_4 = F$, $p = 1$, $s = 0$, $t = 6$, $Y = CH_3$, $Z$ - single bond.

| Acronym | n | m | r | Cr | | SmC* | | SmA | | Iso |
|---|---|---|---|---|---|---|---|---|---|---|
| 4F44F3F4 (S) | 4 | 4 | 4 | * | 47.2 | * | 110.6 | * | 130 | * |
| 4F64F3F4 (S) | 4 | 6 | 4 | * | 53 | * | 105 | * | 132.5 | * |
| 3F14F3F4 (S) | 3 | 1 | 4 | * | 53.6 | * | 93.1 | — | | * |

Examples below illustrate aspects of invention in more detail. Temperature in all examples is given [° C.] and the composition in weight percentage.

EXAMPLE 1

Two components, eutectic, racemic mixture of following composition has been prepared:

| 3F3HF(R,S) | 41.94 wt. % |
|---|---|
| 3F3FF(R,S) | 58.06 wt. % |

Observed phase transitions at heating cycle:
Cr 26.4 SmC$_A$ 91.8 SmC 95.1 Iso

EXAMPLE 2

Two component eutectic racemic mixture of following composition has been prepared:

| 3F3FF(R,S) | 62.23 wt. % |
|---|---|
| 3F3HH(R,S) | 37.77 wt. % |

Observed phase transitions at heating cycle:
Cr 28.7 SmC$_A$ 102.6 SmC 106.7 Iso This mixture was dopted with the different amount of chiral compounds and mixtures with short or long helical pitch were obtained. They are shown in the examples given below.

EXAMPLE 3

Three component mixture:

| 3F3FF(R,S) | 49.78 wt. % |
|---|---|
| 3F3HH (R,S) | 30.22 wt. % |

(S,S) 4,4"-bis-(1-methylheptyloxycarbonyl)terphenyl 20 wt. %
has phase transitions:
Cr<20 SmC$_A$*80.9 SmC*89.9 Iso
and shows selective reflection maximum $\lambda_{max}$=0.736 μm at 25° C., p~0.490 μm

EXAMPLE 4

Three component mixture:

| 3F3FF(R,S) | 56.01 wt. % |
|---|---|
| 3F3HH (R,S) | 33.99 wt. % |

(S,S) 4,4"-bis-(1-methylheptyloxycarbonyl)terphenyl 10 wt. %
has phase transitions:
Cr<20 SmC$_A$*98.5 SmC*101.3 Iso and shows selective reflection maximum $\lambda_{max}$=1.574 μm at 25° C., p~1.050 μm

EXAMPLE 5

Three component mixture:

| 3F3FF(R,S) | 59.12 wt. % |
|---|---|
| 3F3HF (R,S) | 35.88 wt. % |

(S,S) 4,4"-bis-(1-methylheptyloxycarbonyl)terphenyl 10 wt. %
Observed Phase Transitions:
Cr<20 SmC$_A$*98.2 SmC*101.9 Iso
The selective reflection of light was not observed in the whole temperature range of the antiferroelectric phase, p>2 μm

EXAMPLE 6

Three component mixture of following composition has been prepared:

| 3F3FF(R,S) | 49.78 wt. % |
|---|---|
| 3F3HF (R,S) | 30.22 wt. % |
| 3F14F3F4 (S) | 20.00 wt. % |

(4-[5-(perfluoropropylmethoxy)butoxy]-4"-(1-methyloheptyloxy)terphenyl)
Observed Phase Transitions:
Cr 10 SmC$_A$*91.8 SmC*95.1 Iso
and maximum of selective reflected light $\lambda_{max}$=1.05 μm (p~0.67 μm) at temperature 20° C. and $\lambda_{max}$=1.01 μm (p~0.67 μm) at temperature 40° C. Decreasing the amounts of chiral compound 3F14F3F4 (S) to 5 wt. % shifts p>2 μm.

EXAMPLE 7

Five component eutectic mixture of following composition has been prepared:

| 3F3HF(R,S) | 11.18 wt. % |
|---|---|
| 3F3FF(R,S) | 16.06 wt. % |
| 3F7HF(S) | 47.21 wt. % |
| 3F5HF(S) | 10.72 wt. % |
| 3F5HF(S) | 10.72 wt. % |
| 3F7FH(S) | 14.03 wt. % |

Observed phase transitions: Cr (—3). SmC$_A$*95.6 SmC*98.8 SmA 100.6 Iso
Tilt θ≈45° at temperature 25° C.

In FIG. 2, the temperature dependence of selective reflection of a) best known orthoconic mixture W-193B and b) mixture described in this example are compared. The mixture of this example exhibits high helical pitch p at low temperatures and its helical pitch temperature dependence is opposite to the observed for W-193B. The helix is unwounding during cooling, which provides higher stability of the unwound order of smectic layer at low temperature.

EXAMPLE 8

Two component eutectic mixture of following composition has been prepared:

| | |
|---|---|
| 3F5HF(S) | 55.31 wt. % |
| 3F3HF(R,S) | 33.69 wt. % |

The observed phase transitions: Cr 19.2 $SmC_A^*$ 93.9 $SmC^*$ 95.4 Iso and helical pitch p=3.3 μm at the room temperature.

EXAMPLE 9

Two component mixture of following composition has been prepared:

| | |
|---|---|
| 3F3HF(R,S) | 80 wt. %. |

(S) 4-(1-methylhepyloxycarbonyl)biphenyl 4-(perfluorohexyletyl)benzoate 20 wt. %
Observed phase transitions in heating and cooling cycle are respectively:
Cr 53.5 $SmC_A^*$ 69.5 $SmC^*$ 76.7 Iso
Iso 76.7 $SmC^*$ 68.3 $SmC_A^*$
The selective reflection of light was not observed in the whole temperature range of the antiferroelectric phase, p>2 μm

EXAMPLE 10

Two component eutectic mixture of following composition has been prepared:

| | |
|---|---|
| 3F5HF(S) | 52.52 wt. % |
| 3F7FH(S) | 47.48 wt. % |

Components have been melted, heated to clearing point, mixed and then cooled. Phase transition temperatures were determined by means of thermo-microscopy in heating and cooling cycle.
Following phase transition temperatures have been detected:
Heating: Cr 15.1 $SmC_A^*$ 100.5 $SmC^*$ 103.6 SmA 106.1 Iso
Cooling: Iso 105.7 SmA103.4 $SmC^*$ 101.7 $SmC_A^*$ crystallization <0° C.
The helical was measured by a wedge method; p~6 μm and shows small temperature denpendence (see FIG. 4). The spontaneous polarization was P=285 nC/cm², and the tilt was θ=43° at 25° C.
The characteristic tristable switching is observed and cell generates a perfect dark state.

EXAMPLE 11

To bicomponent mixture from example 10 racemic compound 3F3FF(R,S) was added and the three-component mixture of following composition has been formulated:

| | |
|---|---|
| 3F7HF(S) | 33.94 wt. % |
| 3F5HF(S) | 34.57 wt. % |
| 3F3FF(R,S) | 31.49 wt. %. |

Observed Phase Transitions:
Cr 6.5 $SmC_A^*$ 98.4 $SmC^*$ 100.3 SmA 102.4 Iso
Selective light reflection is not observed to 3 μm in all the temperature range of aniferroelectric ($SmC_A^*$) phase. The material generates perfect dark state, after electrical field applying characteristic tristable hysteresis is observed. At 25° C., θ=42°, P=200 nC/cm²

EXAMPLE 12

A two component eutectic mixture of following composition has been prepared:

| | |
|---|---|
| 3F5HF(S) | 68.00 wt. % |
| 3F6HF(S) | 32.00 wt. % |

Observed phase transitions temperatures in heating cycle:
Cr 20 $SmC_A^*$ 98.4 $SmC^*$ 105.3 Iso
Wavelength of selectively reflected light $\lambda_{max}$ decreases with rise of temperature in range from 1.8 μm at 25° C. to 1.4 μm, p=1.2 μm, θ=45° at 25° C.

EXAMPLE 13

A two component mixture of following composition has been prepared:

| | |
|---|---|
| 3F5HF(S) | 54.4 wt. % |
| 3F6FF(S) | 25.6 wt. % |

(S) 4-(1-methylheptyloxycarbonyl)phenyl 4-(6-perfluoropentanoyloxyhexoxy)biphenylate
Observed phase transitions: Cr 10 $SmC_A^*$ 98.4 $SmC^*$ 100 Iso

EXAMPLE 14

A two component mixture of following composition has been prepared:

| | |
|---|---|
| 3F5HF(S) | 54.4 wt. % |
| 3F6FF(S) | 25.6 wt. % |
| 3F6EHH(S) | 20.0 wt. %. |

Observed phase transitions: Cr $SmC_A^*$ 93.4 $SmC^*$ 104.0 SmA 105.6 Iso
At 25° C. p>2 μm θ=45°

EXAMPLE 15

Three component mixture of following composition has been prepared:

| | |
|---|---|
| 3F3HF(S) | 25.73 wt. % |
| 3F5HF(S) | 17.42 wt. % |
| 3F7HF(S) | 56.85 wt. % |

Figure 5:
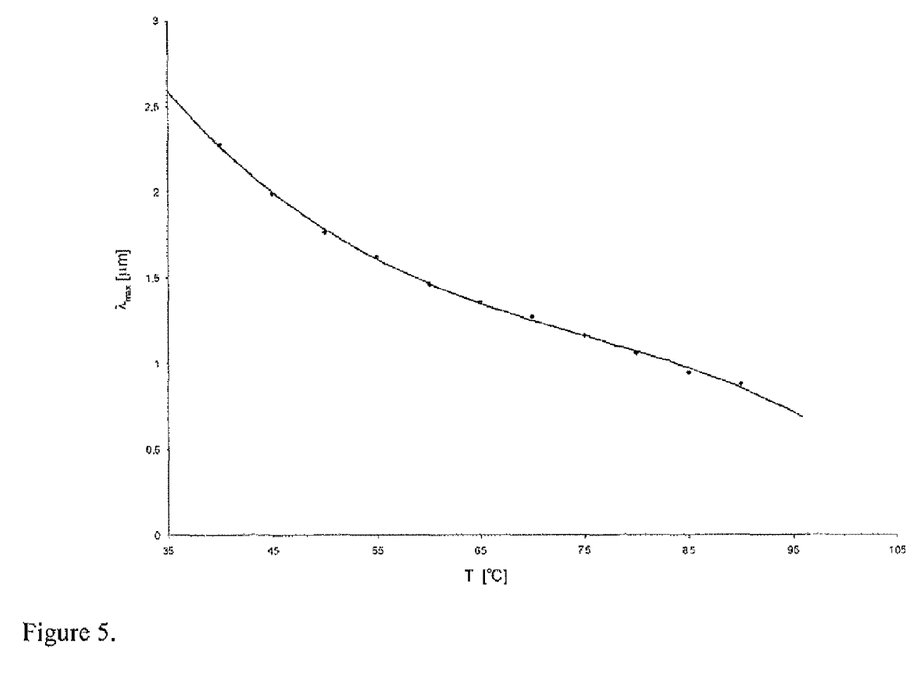
FIG. 5 is a schematic presentation of temperature dependence of a mixture prepared in accordance with another example of the present invention.

Observed phase transitions: Cr (−5.3) SmC$_A$*94.5 SmC*96.7 SmA 97.6 Iso
p decreases with rise of temperature, FIG. 5.
Value p~2.3 μm from extrapolates to 25° C.

EXAMPLE 16

Mixture from example 15 was doped by the compound:
(S) 1-(methylheptyloxycarbonyl)phenyl 4-(perfluorohexyl-ethyloxy)benzoate in 9.14 wt. %
Observed phase transitions:
Cr −10 SmC$_A$*84.4 SmC*86.3 SmA 90.0 Iso
p=1.3 μm at 25° C. and decreases with increase of temperature.

EXAMPLE 17

Three component mixture of following composition has been prepared:

| | |
|---|---|
| 3F3HF(S) | 39.83 wt. % |
| 3F4HF(S) | 26.12 wt. % |
| 3F6HF(S) | 34.05 wt. % |

Observed phase transitions:
Cr 17.2 SmC$_A$*85.3 SmC*104.5 Iso
At 25° C., θ=45°, p>2.0 μm ($\lambda_{max}$>3 μm)

EXAMPLE 18

Three component mixture of following composition has been prepared:

| | |
|---|---|
| 3F3FF(S) | 22.34 wt. % |
| 3F5FF(S) | 36.88 wt. % |
| 3F7FF(S) | 40.78 wt. % |

Observed phase transitions:
Cr 17.3 SmC$_A$105.1 SmC*100.5 SmA 108.3 Iso
At 25° C., θ=45°, p>2.0 μm ($\lambda_{max}$>3 μm).

EXAMPLE 19

Four component eutectic mixture with composition:

| | |
|---|---|
| 3F7FH (S) | 16.48 wt. % |
| 3F7HF (S) | 49.82 wt. % |
| 3F5HF (S) | 12.39 wt. % |
| 3F3HF (S) | 21.31 wt. % | has phase transition:
Cr −10 SmC$_A$*96.9 SmC*98.8 SmA 100.1 Iso
and p>2 μm at 25° C. and decreases with temperature increase.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:
1. The antiferroelectric mixture containing at least one achiral compound of general formula 1, wherein the lateral substituents $X_1$, $X_2$, $X_3$, $X_4$, $X_5$, $X_6$, $X_7$ and $X_8$ in the benzene rings represent independently hydrogen and fluorine atoms, Z is the single bond or COO or CH$_2$CH$_2$ or CH$_2$O or OCH$_2$ group, the substituent Y in the chain is CH$_3$ or C$_2$H$_5$ or CH$_2$F or CHF$_2$ or CF$_3$ group; symbols n, m, r and t are independently integers of 1 to 8; symbols p and s are independently 0 to 1 and
at least one chiral compound (R or S enantiomer) of the said formula 1.
2. The antiferroelectric mixture containing at least one racemic compound of general formula 1, wherein the lateral substituents $X_1, X_2, X_3, X_4, X_5, X_6, X_7$ and $X_8$ in the benzene rings represent independently hydrogen and fluorine atoms, Z is the single bond or COO or $CH_2CH_2$ or $CH_2O$ or $OCH_2$ group, the substituent Y in the chain is $CH_3$ or $C_2H_5$ or $CH_2F$ or $CHF_2$ or $CF_3$ group; symbols n, m, r and t are independently an integer of 1 to 8; symbols p and s are independently 0 to 1, and a chiral compound (S or R enantiomer) of general formula 2, wherein the lateral substituents $X_1, X_2, X_3, X_1, X_5, X_6, X_7$ and $X_8$ in the benzene rings represent independently hydrogen and fluorine atoms, Z is the single bond or COO or $CH_2CH_2$ or $CH_2O$ or $OCH_2$ group, the substituent Y in the chain is $CH_3$ or $CH_2F$ or $CHF_2$ or $CF_3$ group, symbols n, m, r and t are independently integers of 1 to 8; symbols p and s are independently 0 to 1 and/or another chiral component selected from the chiral compounds having strong helical twisting power.

3. The antiferroelectric mixture containing at least two of the same R or S enantiomeric chiral compounds of the general formula 1, wherein the lateral substituents $X_1, X_2, X_3, X_4, X_5, X_6, X_7$ and $X_8$ in the benzene rings represent independently hydrogen and fluorine atoms, Z is the single bond or COO or $CH_2CH_2$ or $CH_2O$ or $OCH_2$ group, the substituent Y in the chain is $CH_3$ or $C_2H_5$ or $CH_2F$ or $CHF_2$ or $CF_3$ group; symbols n, m, r and t are independently an integer of 1 to 8; symbols p and s are independently 0 to 1, wherein at least one of said compounds show long helical pitch at low temperature range which value decreases upon increase of the temperature.

4. The chiral compound of general formula 1, wherein the lateral substituents $X_1, X_2, X_3, _{X4}, X_5, X_6, X_7$ and $X_8$ in the benzene rings represent independently hydrogen and fluorine atoms, Z is the single bond or COO or $CH_2CH_2$ or $CH_2O$ or $OCH_2$ group, the substituent Y in the chain is $CH_3$ or $C_2H_5$ or $CH_2F$ or $CHF_2$ or $CF_3$ group, symbol n is equal 3 or 4, symbols m, r and t are independently integers of 1 to 8, symbols p and s are independently 0 to 1 and showing long helical pitch at room temperature which value decreases with the increase of temperature.

5. The chiral compound according to claim 4, wherein symbols r=5 or 6 or 7, m=1, Z is the single bond or COO group, Y is $CH_3$ group.

6. The chiral compound according to claim 5, wherein symbols r=7, m=1, t=6, Z is the single bond or COO group, Y=$CH_3$ group.

7. The chiral compound of general formula 2, wherein the lateral substituents $X_1$, $X_2$, $X_3$, $X_4$, $X_5$, $X_6$, $X_7$ and $X_8$ in the benzene rings represent independently hydrogen and fluorine atoms, Z is the single bond or COO or $CH_2CH_2$ or $CH_2O$ or $OCH_2$ group, the substituent Y in the chain is $CH_3$ or $CH_2F$ or $CHF_2$ or $CF_3$ group, symbols n, m, r and t are independently integers of 1 to 8; symbols p and s are independently 0 to 1.

8. The chiral compound according to claim 7, wherein Z signifies the single bond.

9. A preparation method of the antiferroelectric mixtures from smectic anticlinic compounds, which comprises the steps of adding to at least one achiral racemic compound of general formula 1, wherein the lateral substituents $X_1$, $X_2$, $X_3$, $_4$, $X_5$, $X_6$, $X_7$ and $X_8$ in the benzene rings represent independently hydrogen and fluorine atoms, Z is the single bond or COO or $CH_2CH_2$ or $CH_2O$ or $OCH_2$ group, the substituent Y in the chain is $CH_3$ or $C_2H_5$ or $CH_2F$ or $CHF_2$ or $CF_3$ group, symbol n is an integer 3 or 4, symbols m, r and t are independently integers of 1 to 8, symbols p and s are independently 0 to 1, at least one chiral compound (R or S enantiomer) of the said formula 1 in a weight ratio of an eutectic composition or in the less weight ratio.

10. A preparation method of the antiferroelectric mixtures from smectic anticlinic compounds, which comprise the steps of adding to at least one achiral racemic compound of general formula 1, wherein the lateral substituents $X_1$, $X_2$, $X_3$, $X_4$, $X_5$, $X_6$, $X_7$ and $X_8$ in the benzene rings represent independently hydrogen and fluorine atoms, Z is the single bond or COO or $CH_2CH_2$ or $CH_2O$ or $OCH_2$ group, the substituent Y in the chain is $CH_3$ or $C_2H_5$ or $CH_2F$ or $CHF_2$ or $CF_3$ group, symbols n, m, r and t are independently integers of 1 to 8; symbols p and s are independently 0 to 1, at least one chiral compound (R or S enantiomer) of general formula 2, wherein the lateral substituents $X_1, X_2, X_3, X_4, X_5, X_6, X_7$ and $X_8$ in the benzene rings represent independently hydrogen and fluorine atoms, Z is the single bond or COO or $CH_2CH_2$ or $CH_2O$ or $OCH_2$ group, the substituent Y in the chain is $CH_3$ or $CH_2F$ or $CHF_2$ or $CF_3$ group, symbols n, m, r and t are independently integers of 1 to 8; symbols p and s are independently 0 to 1 and/or other chiral compounds with strong helical twisting power in the amount of 2 to 30 wt. %.

11. A preparation method of the antiferroelectric mixtures from smectic anticlinic compounds, which comprise the steps of adding to at least one compound selected from a chiral enantiomer R or S compound of general formula 1, wherein the lateral substituents $X_1, X_2, X_3, X_4, X_5, X_6, X_7$ and $X_8$ in the benzene rings represent independently hydrogen and fluorine atoms, Z is the single bond or COO or $CH_2CH_2$ or $CH_2O$ or $OCH_2$ group, the substituent Y in the chain is $CH_3$ or $C_2H_5$ or $CH_2F$ or $CHF_2$ or $CF_3$ group; symbols n, m, r and t are independently an integer of 1 to 8; symbols p and s are independently 0 to 1, which helical pitch increases with temperature increase, and at least one chiral compound of general formula 1 which helical pitch p decreases with temperature increase.

12. The antiferroelectric mixture of claim 1, wherein n is 3 or 4.

13. The antiferroelectric mixture of claim 12, wherein said chiral compound of formula 1 is present in an amount of 2 wt. % to 50 wt. % based on the total weight of the mixture.

14. A racemic compound of general formula 1, wherein the lateral substituents $X_1, X_2, X_3, X_4, X_5, X_6, X_7$, and $X_8$ in the benzene rings represent independently hydrogen and fluorine atoms, Z is a single bond or COO or $CH_2CH_2$ or $CH_2O$ or OCH group, the substituent Y in the chain is $CH_3$, $C_2H_5$, $CH_2F$, $CHF_2$ or $CF_3$ group wherein n is 3 or 4, and m, r and t are independently integers of 1 to 8; p and s are independently 0 to 1.

15. The racemic mixture of general formula 1, wherein $X_1$-$X_8$ are independently hydrogen and fluorine atoms and at least one of $X_1$-$X_8$ is fluorine, Z is a single bond, COO, $CH_2CH_2$, $CH_2O$ or $OCH_2$ group, Y is $CH_3$, $C_2H_5$, $CH_2F$, $CHF_2$ or $CF_3$ group, n, m, r and t are independently integers of 1 to 8; p and s are independently 0 to 1.

16. The racemic mixture of claim 15, wherein n is 3 or 4.

* * * * *

UNITED STATES PATENT AND TRADEMARK OFFICE
CERTIFICATE OF CORRECTION

PATENT NO. : 8,101,095 B2
APPLICATION NO. : 12/759185
DATED : January 24, 2012
INVENTOR(S) : Roman Slawomir Dabrowski et al.

It is certified that error appears in the above-identified patent and that said Letters Patent is hereby corrected as shown below:

On the title page item [56], Reference Cited:
"W. Drzewinski et al., Orthoconic Antiferroelectrics, "Synthesis and Mesomorphic Properties of Optically Active (S)-(+)-4(1-Methylheptyloxcarbonyl) phenyl 4'"
After "-4(1-Methylheptyloxcarbonyl)", replace "phyny" with --phenyl--.

On the title page item [56], Reference Cited:
"R. Dabrowski et al., "High Tilted Antiterroelectrie Liquid Crystalline Materials," Elsevier, Display 26, pp. 9-19, 2004."
After "Display", replace "26" with --25--.

Column 11, line 38: replace "$\alpha$" with --a--.
Column 12, line 26: replace "," with --.--.
Column 16, line 65: replace "(-3)" with --(-13)--.
Column 19, line 47: replace "SmC" with --SmC*--.
Column 21, Claim 4, line 61: replace "x4" with --X4--.
Column 23, Claim 9, line 37: replace "4" with --X4--.

Signed and Sealed this
Twenty-sixth Day of June, 2012

David J. Kappos
*Director of the United States Patent and Trademark Office*